(12) United States Patent
Ofer et al.

(10) Patent No.: US 6,904,470 B1
(45) Date of Patent: Jun. 7, 2005

(54) DEVICE SELECTION BY A DISK ADAPTER SCHEDULER

(75) Inventors: Adi Ofer, Wellesley, MA (US); William P. Powers, Jr., Sutton, MA (US); Gilad Sade, Newton, MA (US); Amit Kumar, Franklin, MA (US); Stephen R. Ives, Shrewsbury, MA (US); Ran Margalit, Providence, RI (US); Daniel E. Rabinovich, Wrentham, MA (US); Peng Yin, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/397,403

(22) Filed: Mar. 26, 2003

(51) Int. Cl.[7] .............................................. G06F 13/00
(52) U.S. Cl. ........................... 710/6; 718/104; 718/105
(58) Field of Search ........................... 710/5–7, 15–20, 710/36; 711/114, 167, 170; 707/7; 718/100–106

(56) References Cited

U.S. PATENT DOCUMENTS

| | | | | |
|---|---|---|---|---|
| 5,392,430 A | * | 2/1995 | Chen et al. ................. | 718/102 |
| 5,671,405 A | * | 9/1997 | Wu et al. ...................... | 707/7 |
| 5,905,995 A | * | 5/1999 | Tabuchi et al. ............. | 711/114 |
| 5,937,205 A | * | 8/1999 | Mattson et al. ................ | 710/6 |
| 6,119,174 A | * | 9/2000 | Borowsky et al. ............ | 710/15 |
| 6,141,707 A | * | 10/2000 | Halligan et al. ............. | 710/36 |
| 6,633,954 B1 | * | 10/2003 | Don et al. ................... | 711/114 |
| 6,665,740 B1 | * | 12/2003 | Mason et al. .................. | 710/6 |

* cited by examiner

*Primary Examiner*—Christopher B. Shin
(74) *Attorney, Agent, or Firm*—Daly, Crowley, Mofford & Durkee, LLP

(57) ABSTRACT

A scheduler for selecting a logical volume for scheduling pending I/O tasks for job generation. The scheduler includes a main scheduler that selects from among multiple sub-schedulers that operate according to different scheduling approaches, e.g., high priority read I/O request scheduling, urgency of non-read I/O tasks, as well as load balancing and round robin schemes. In selecting a sub-scheduler, the main scheduler considers the amount of time allocated to performing read I/O requests, as well as the level of urgency associated with the logical volumes and the disk adapter that manages those logical volumes for non-read I/O tasks.

23 Claims, 13 Drawing Sheets

FIG. 8

| | 90% | 85% | 80% | 75% | 70% | 65% | 60% | 50% |
|---|---|---|---|---|---|---|---|---|
| | O | O | O | O | O | O | O | O |
| | R | R | R | R | R | R | R | R |
| | R | R | R | O | O | O | O | O |
| | R | R | R | R | R | R | R | R |
| | R | O | O | O | O | O | O | R |
| | R | R | R | R | R | R | R | O |
| | R | R | R | R | R | R | R | O |
| | R | R | R | R | R | O | O | R |
| | R | R | R | R | R | R | R | O |
| | R | R | R | R | R | R | R | R |
| | O | O | O | O | O | O | O | O |
| | R | R | R | R | R | R | R | R |
| | R | R | R | O | O | O | O | O |
| | R | R | R | R | R | R | R | R |
| | R | R | R | R | R | R | R | O |
| | R | R | O | O | O | O | O | R |
| | R | R | R | R | R | R | R | O |
| | R | R | R | R | R | R | O | R |
| | R | R | R | R | R | R | R | O |
| | R | R | R | R | R | R | R | R |

| DA Urgency Level | Urgency | Load Balancing | Round Robin |
|---|---|---|---|
| 0 | 20% | 70% | 10% |
| 1 | 30% | 60% | 10% |
| 2 | 40% | 50% | 10% |
| 3 | 50% | 40% | 10% |
| 4 | 60% | 30% | 10% |
| 5 | 70% | 20% | 10% |
| 6 | 80% | 10% | 10% |
| 7 | 90% | 5% | 5% |

| | 0 | 1 | 2 | 3 | 4 | 5 | 6 | 7 |
|---|---|---|---|---|---|---|---|---|
| 15 | R | R | R | R | R | R | U | R |
| 14 | L | U | L | U | L | U | R | U |
| 13 | L | L | U | L | U | U | U | U |
| 12 | L | L | L | U | U | U | U | U |
| 11 | U | U | L | U | L | L | U | U |
| 10 | L | L | U | L | U | U | U | U |
| 9 | L | L | L | U | U | L | U | U |
| 8 | L | U | L | L | U | L | L | L |
| 7 | R | L | L | U | L | U | U | U |
| 6 | L | L | U | U | U | U | U | U |
| 5 | L | U | L | U | L | U | U | U |
| 4 | L | L | R | R | U | U | L | U |
| 3 | U | L | U | L | U | L | U | U |
| 2 | L | U | L | U | L | U | U | U |
| 1 | L | L | U | L | U | U | U | U |
| 0 | L | L | L | U | U | U | U | U |

128, 174, 172

DEVICE SELECTION BY A DISK ADAPTER SCHEDULER

BACKGROUND

The invention relates generally to data storage systems, and in particular, to job scheduling for I/O tasks directed to devices in data storage systems.

In typical data storage systems, a storage controller serves as an interface between external host computers and the physical storage devices of the data storage system, and thus controls all back-end (or device-side) operations. The back-end operations can include services for read misses, as well as write destaging, read prefetching, RAID, data copy and other types of background operations. The scheduling of these types of operations has a major effect on the performance of the data storage system as a whole.

SUMMARY

In an aspect of the invention, scheduling I/O tasks directed to logical volumes that are associated with physical resources of a data storage system includes selecting one of the logical volumes based on criteria related to type of I/O task and choosing an I/O task directed to the selected one of the logical volumes.

Embodiments of the invention may include one or more of the following features.

The criteria includes I/O task urgency and priority.

The logical volume selection uses a main scheduler to select a sub-scheduler from multiple sub-schedulers based on the criteria, and uses the selected sub-scheduler to select the logical volume.

One of the sub-schedulers operates to select a logical volume for I/O tasks that are read I/O requests.

The other sub-schedulers include an urgency sub-scheduler that operates to select a logical volume for non-read I/O tasks based on urgency of the non-read I/O tasks.

The other sub-schedulers further include a sub-scheduler that operates to select a logical volume using a round robin algorithm.

The other sub-schedules further include a sub-scheduler that operates to select a logical volume based on a load balancing of the physical resources.

The logical volumes are controlled by a disk adapter, and using the main scheduler includes:
(i) defining a range of urgency levels; (ii) determining an urgency level in the range of urgency levels for each of the logical volumes based on urgency levels associated with non-read I/O tasks pending on such logical volume; (iii) defining a range of disk adapter urgency levels from a lowest to a maximum value; (iv) associating with the disk adapter urgency levels in the range of disk adapter urgency levels time percentages each corresponding to amounts of time allocated to performing read I/O requests, the time percentage associated with the maximum value being the lowest of the time percentages; (v) determining if a maximum number of write pendings has been reached for the data storage system; (vi) determining a disk adapter urgency level as a value in the range for the disk adapter based on the urgency levels of the logical volumes if it is determined that the maximum number of write pendings has not been reached for the data storage system; (vii) setting the disk adapter urgency value to the maximum value in the range of disk adapter urgency levels if it is determined that the maximum number of write pendings has been reached for the data storage system; (viii) determining which of the time percentages is associated with the determined disk adapter urgency level; (ix) and using the determined time percentage to select between the read sub-scheduler and the others of the sub-schedulers.

Using the main scheduler further includes using a probability-based lookup to determine which of the other sub-schedulers to use if the read scheduler is not selected. The probability-based lookup uses a table populated with elements corresponding to the other sub-schedulers according to pre-determined time percentages corresponding to amounts of time allocated to the other sub-schedulers. The table has rows corresponding to the disk adapter urgency levels. The disk adapter urgency level is used to index into the table.

The logical volumes are placed on one of a plurality of queues according to the determined urgency level of each logical volume, each of the queues corresponding to a different one of the urgency levels in the range of urgency levels. The urgency sub-scheduler checks the queues in order from higher urgency level to lowest urgency level to find a non-empty queue, and selects a first available logical volume from the queue.

Among the advantages of the job scheduling mechanism of the invention are the following. The job scheduling mechanism takes factors besides loading concerns into consideration for logical device selection. In particular, the two levels of scheduling take into account the nature of the work, in terms of both task priority and urgency, that a logical device needs to perform. This approach avoids problems that may occur when a device selection is based solely on load, e.g., a device reaches its maximum write pending threshold but is not selected due to load balancing decisions. While recognizing that load balancing is needed to optimize system performance, the technique also recognizes that tasks have different priorities and those priorities need to be taken into consideration during device selection. In addition, the architecture of the job scheduler is a highly flexible, extensible one. For example, various parameters and aspects of the meta- and sub-schedulers may be tunable at configuration time, and some while the system is operating as well. Also, the sub-schedulers can be enabled or disabled (by the user) as system requirements dictate, and, because of the modularity of the sub-scheduler implementation, sub-schedulers can be easily added to or deleted from the scheduler code if necessary.

Other features and advantages of the invention will be apparent from the following detailed description, and from the claims.

BRIEF DESCRIPTION OF THE DRAWINGS

FIG. 8 is a read scheduler selection table used by the meta scheduler.

FIG. 9 is a non-read percentage table used by the meta scheduler.

FIG. 10 is a non-read task scheduler lookup table used by the meta scheduler.

Like reference numerals will be used to represent like elements.

DETAILED DESCRIPTION

Figure 1:
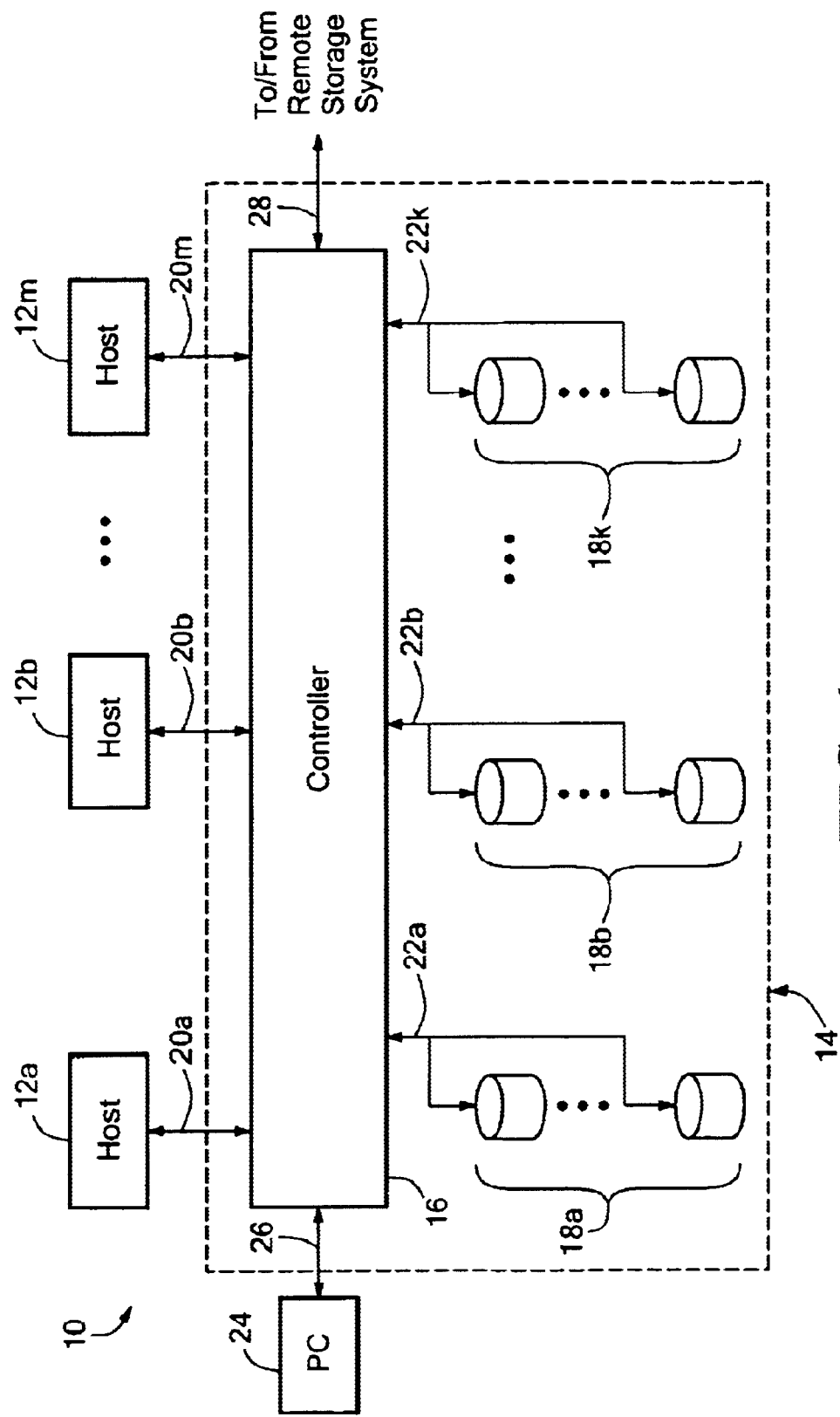
FIG. 1 is a block diagram of a data storage system in which the invention can be employed.

Referring to FIG. 1, a data processing system 10 includes a plurality of host computers 12a, 12b, . . . , 12m, connected to a data storage system 14. The data storage system 14 can be, for example, that made by EMC Corporation and known as the Symmetrix® data storage system. The data storage system 14 receives data and commands from, and delivers data and responses to, the host computers 12. The data storage system 14 is a mass storage system having a controller 16 coupled to pluralities of physical storage devices (or, simply, physical devices) shown as physical disks 18a, physical disks 18b, . . . , physical disks 18k. Each of the physical devices 18 is logically divided, in accordance with known techniques, into one or more logical volumes.

The controller 16 interconnects the host computers 12 and the physical devices 18. The controller 16 thus receives memory write commands from the various host computers over buses 20a, 20b, . . . , 20m, respectively, and delivers the data associated with those commands to the appropriate physical devices 18a, 18b, . . . , 18k, over respective connecting buses 22a, 22b, . . . , 22k. The controller 16 also receives read requests from the host computers 12 over buses 20, and delivers requested data to the host computers 12, either from a cache memory of the controller 16 or, if the data is not available in cache memory, from the physical devices 18. Buses 20 can be operated in accordance with any one of a number of different bus protocols, such as Fibre Channel, SCSI, FICON and ESCON, to name but a few. Likewise, buses 22 can also be operated in accordance with any one of a number of different bus protocols, for example, Fibre Channel, SCSI and Serial ATA, as well as others.

In a typical configuration, the controller 16 also connects to a console PC 24 through a connecting bus 26. Console PC 24 is used for maintenance and access to the controller 16 and can be employed to set parameters of the controller 16 as is well known in the art.

Figure 2:
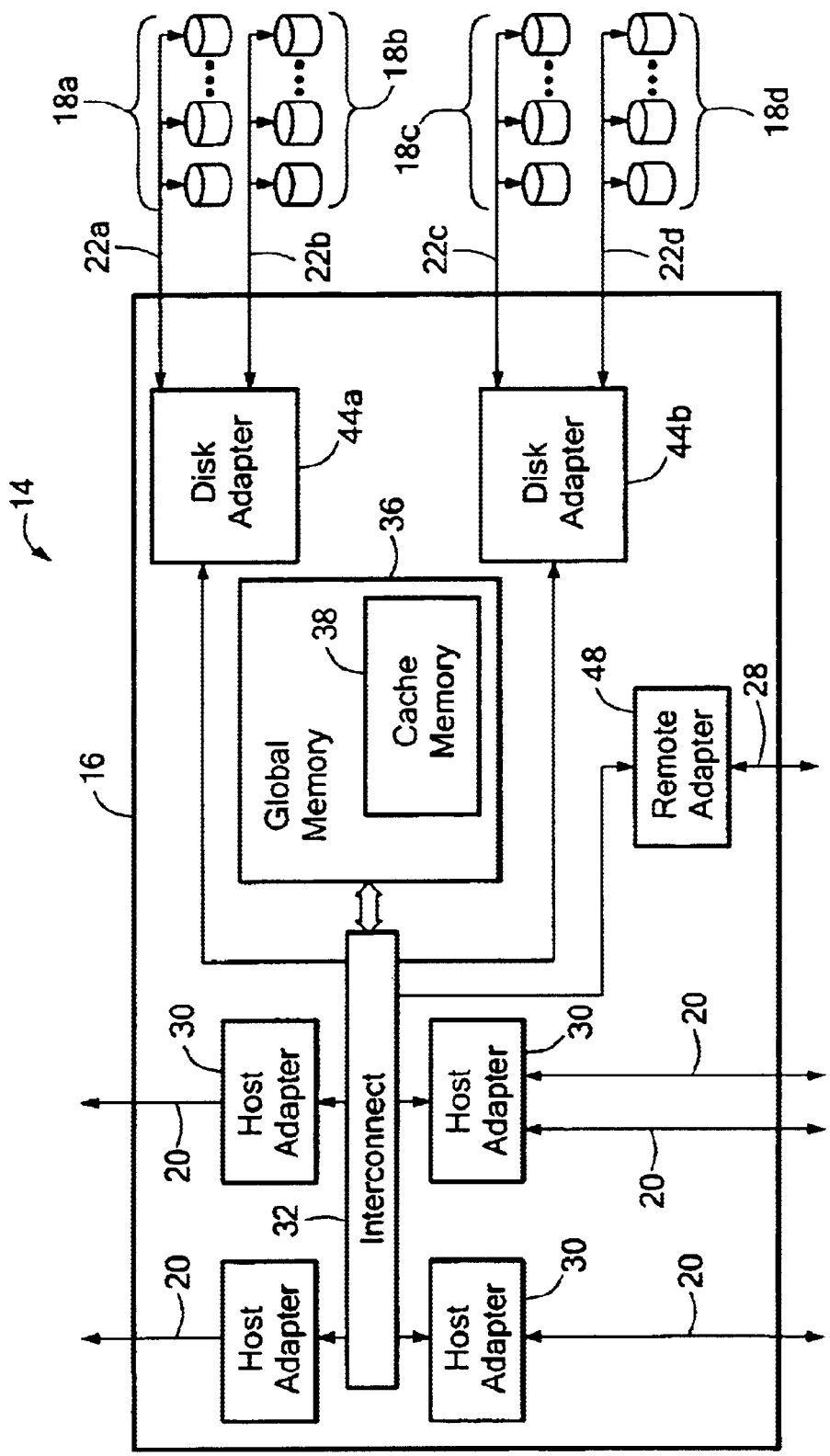
FIG. 2 is a detailed block diagram of the controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the controller in the Symmetrix® data storage system as an illustrative example, details of the internal architecture of the data storage system 14 are shown. The communications from the host computer 12 typically connects to a port of a plurality of host adapters 30 over the bus lines 20. Each host adapter, in turn, connects to a global memory 36 via an interconnect 32. The interconnect can be, for example, a bus structure, a point-to-point interconnect such as a crossbar structure, or any other type of interconnect. The global memory 36 includes a cache memory 38 for storing data, as well as various data structures (not shown) for maintaining control information.

Also connected to the global memory 36 through the interconnect 32 are device adapters shown as disk adapters 44, which control the physical devices 18 and handle the controller's back-end operations, which include services for read misses, write destaging, read prefetching, RAID, data copy, as well as other background drive operations.

The host adapters 30 can communicate with the disk adapters 44 through either the global memory 36 or some other messaging scheme. In one embodiment, the disk adapters are installed in controller 16 in pairs. Thus, for simplification, only two disk adapters, indicated as disk adapters 44a and 44b, are shown. However, it will be understood that additional disk adapters may be employed by the system.

Each of the disk adapters 44a, 44b supports multiple bus ports, as shown. For example, the disk adapter (DA) 44a connects to buses 22a and 22b, and DA 44b connects to buses 22c and 22d. Each DA can support additional buses as well. Connected to buses 22a and 22b are a plurality of physical devices (shown as disk drive units) 18a and 18b, respectively. Connected to the buses 22c, 22d are the plurality of physical devices 18c and 18d, respectively. The DAs 44, buses 22 and devices 18 may be configured in such a way as to support redundancy, e.g., the devices 18 on the buses 22 can include both primary and secondary devices.

During a write operation, the disk adapters 44 read data stored in the global memory 36 by a host adapter 30 and write that data to the logical volumes for which they are responsible. During a read operation and in response to a read command, the disk adapters 44 read data from a logical volume and write that data to global memory for later delivery by the host adapter to the requesting host computer 12.

The data storage system 14 can be remotely coupled to another data storage system 14 in a mirrored storage configuration via a data link 28. Still referring to FIG. 2, to support such a configuration, each data storage system 14 in the mirrored storage configuration can include a remote adapter 48 to connect to the data link 28 and handle transfers of data over that link. The remote adapter 48 communicates with the global memory 36 over the interconnect 32.

Figure 3:
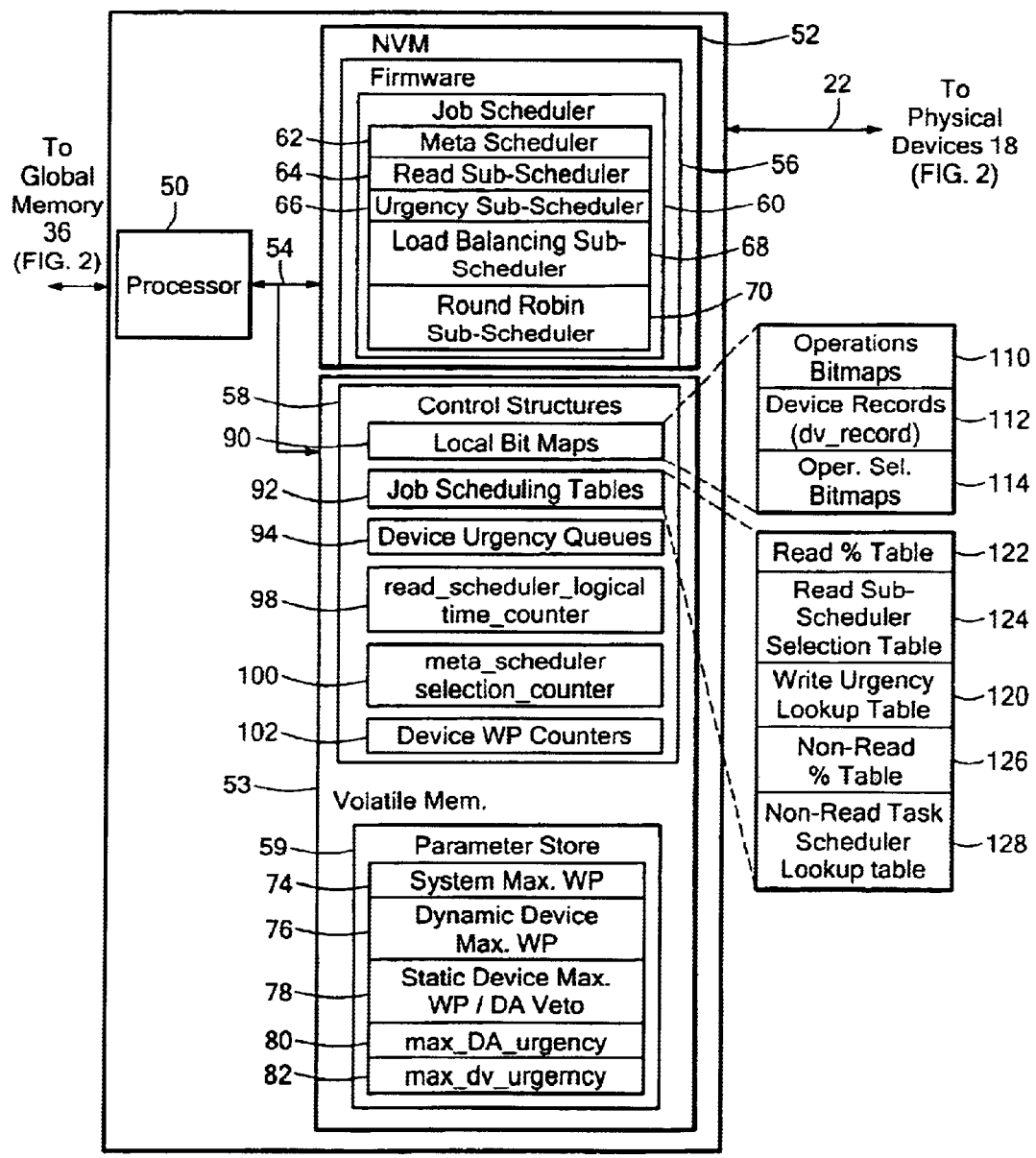
FIG. 3 is a block diagram of the disk adapter shown in FIG. 2.

As shown in FIG. 3, each disk adapter 44 includes at least one processor 50 coupled to a local, nonvolatile memory (NVM), e.g. FLASH memory, 52 and a volatile memory 53 by an internal bus structure 54. The processor 50 controls the overall operations of the disk adapter and communications with the local memories 52 and 53. The local NVM 52 stores firmware 56, and is read each time the data storage system 10 is initialized. Stored in the volatile memory 53 are control data structures 58 and parameter data stored in a parameter store 59. Included as a component of the firmware 56 is a job scheduler 60, which is copied to the processor's internal RAM (or the volatile memory 53)), at initialization for subsequent execution by the processor 50.

In order for the job scheduler 60 of the DA 44 to deal with unbalanced loads, it employs a meta (or "main") scheduler 62 and four separate sub-schedulers for device selection. The sub-schedulers include a response time sensitive host request sub-scheduler referred to herein as a read task sub-scheduler 64, an urgency sub-scheduler 66, a load balancing sub-scheduler 68 and a round robin scheduler 70. The read sub-scheduler 64 schedules devices with pending host read requests (read misses). Although the operation of this sub-scheduler is described herein with respect to host read request scheduling, it can be used to schedule any other type of response time sensitive host requests, e.g., RAID rebuild operations due to a host request. The urgency sub-scheduler 66 schedules devices with pending urgent tasks, for example, write pending tasks when a device has reached a maximum threshold number of write pending slots. The load balancing sub-scheduler 68 schedules devices based on the loading of physical resources, e.g., pipe and drive load. The round robin sub-scheduler 70 schedules all devices via a round robin algorithm. The meta scheduler 62 uses an adaptive algorithm, based on various system-wide and DA-specific considerations, to schedule between the sub-schedulers. The operation of the meta scheduler 62 and sub-schedulers 64, 66, 68, 70 will be described in further detail later.

The parameters stored in the parameter store 59 include the following: a system write pending (WP) ceiling (or system maximum write pending) 74; a static device write pending ceiling 75; a dynamic device write pending ceiling 76; a DA Veto mode or setting(per device) 78; a maximum DA urgency level (max_DA_urgency) 80; and a maximum device urgency level 82 (max_dv_urgency); as well as others not shown. The system write pending ceiling 74 is a value that governs the percentage of slots (in cache memory 38, shown in FIG. 2) that are allowed to be write pending at any given time. Should this ceiling be approached, the DA 44 enters a high-priority write mode in order to destage data and free cache slots. If the ceiling is reached, the host adapters can be disconnected on writes until a sufficient number of writes have been destaged. The dynamic device write pending ceiling 76 is a value that is defined to be some number 'N' (e.g., 3) times the static device limit. It enables devices that are not heavily loaded to continue working. The DA Veto 78 is a device-level mode used to lower the write pending count maintained by the DA 44 for each device it supports. For example, if the DA 44 knows that a device will be in recovery, it sets the DA 44 veto 78. The setting of the DA veto 78 prevents an increase of the dynamic device write pending ceiling 76. Instead, it keeps that ceiling value slightly above the write pending count in order to allow very few writes to occur. When the DA destages data, the value of the dynamic device write pending ceiling is lowered together with the write pending count 102. The DA veto 78 is cleared when the write pending count 102 reaches half the value of the static devicewrite pending ceiling 75. Other rules can be used to control the write pending limit as well.

The control data structures 58 include: local bit maps 90; job scheduling tables 92; device urgency queues 94; and counters, including a read scheduler logical time counter (read_schedule_logical_time) 98, a meta scheduler selection counter (meta_scheduler_selection_counter) 100 and device write pending counters 102 each which maintains a write pending count (dv_wp_count) for a corresponding device supported by the DA 44.

The local bit maps 90 include operations bit maps 110, device records (one record, 'dv_record', per logical volume) 112 and operation selection bitmaps 114. The information in the bit maps 90 is managed by the DA 44, and used by the various scheduling processes of the job scheduler 60, as will be described.

The job scheduling tables 92 include the following: a write urgency lookup table 120; a read percentage table 122; a read scheduler selection table 124; a non-read percentage table 126; and a non-read task scheduler lookup table 128; all of which are used by the meta scheduler 62 in a manner to be described later.

Still referring to FIG. 3, the DA 44 uses the operations bitmaps 110 to track pending jobs. Each operation has an associated bitmap with a bit allocated for each logical volume in the system. For example, when a new read request directed to a particular logical volume is placed in a request buffer in the global memory 36 by one of the host adapters 20 for the disk adapter 44 that supports that logical volume, a_flag is raised by setting a bit in a read request bitmap for the targeted logical volume. In the described embodiment, the size of each operation's bitmap, e.g., 4096 bits, is a function of the number of logical volumes supported in the system. Since the logical volumes are evenly distributed across the disk adapters, the bits representing the logical volumes supported by a single disk adapter are spread throughout a given bitmap. The system further provides for a logical OR'ing of the operations bitmaps to produces a flag for each logical volume indicating if the volume has any pending jobs to execute and places this flag in a New Task bitmap. Table 1 illustrates exemplary job pending related operations bitmaps and their functions for the logical volume level.

TABLE 1

| Operations Bitmap Name | # of Bits | # of Bitmaps | Description |
|---|---|---|---|
| Read Request | 4096 | 1 | Indicates which logical volumes have host reads to perform (via mailbox flag). |
| Write Request | 4096 | 1 | Indicates which logical volumes have writes to perform. |
| Copy Request | 4096 | 1 | Indicates which logical volumes have copies to perform. |
| Prefetch Request | 4096 | 1 | Indicates which logical volumes have prefetches to perform. |
| Scrub Request | 4096 | 1 | Indicates which logical volumes have data scrubbing operations to perform. |
| RAID Request | 4096 | 2 (high priority and normal) | Indicates which logical volumes have RAID jobs to perform. |
| New Task | 4096 | 1 | Logical OR of all of the above bitmaps (except the Read Request) and removal of bits corresponding to devices not supported by DA. |

All of the operations bitmaps are stored locally in the DA 44 in the operations bitmaps 110, as mentioned earlier.

Figure 4:
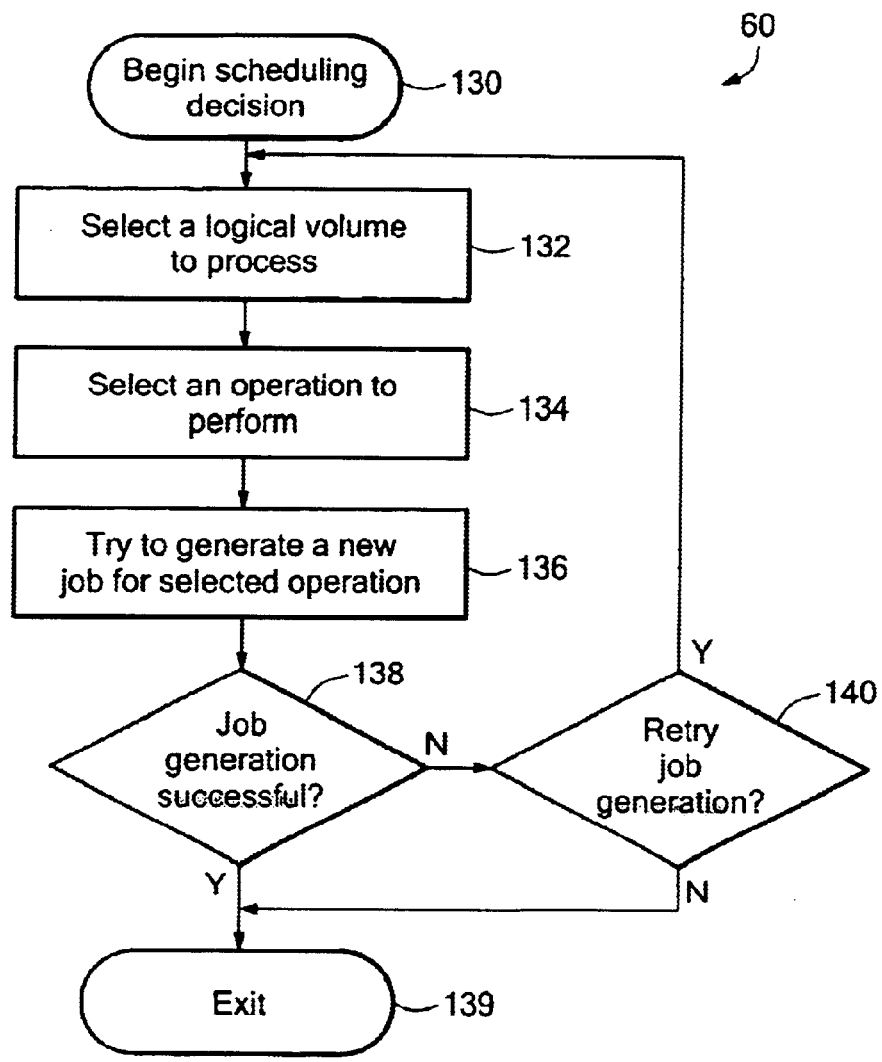
FIG. 4 is a flow diagram of a job scheduling process (of the disk adapter shown in FIG. 3) that utilizes a logical volume (device) selection process that includes a meta scheduler and four sub-schedulers, including a read sub-scheduler, an urgency sub-scheduler, a load-balancing sub-scheduler and a round robin sub-scheduler.

Referring to FIG. 4, an overview of the job scheduler 60 is shown. The scheduler 60 commences a scheduling operation (step 130). The scheduler 60 selects a logical volume to process using the meta scheduler 62 and a selected one of the four sub-schedulers 64, 66, 68, 70 (step 132). Once a logical volume is selected for processing, the scheduler 60 selects an operation to be performed (step 134). At this point, the scheduler attempts to prepare a new job for the selected operation (step 136). The job generation is not always successful because of additional factors that could not be included in the scheduling decision. Thus, the scheduler 60 determines whether or not the job preparation is successful (step 138). If the job preparation is successful, the scheduler exits (step 139). If the job preparation fails, the scheduler 60 determines if a job generation retry operation is permitted (step 140). If so, the scheduler 60 returns to the logical volume selection (beginning with the sub-scheduler selection by the meta scheduler) at step 132 to select a different logical volume for a new job generation attempt. If a retry is not permitted, e.g., the number of retries exceeds some threshold number, such as five, the scheduler 60 aborts the scheduling operation and exits (at step 139).

An example of a mechanism which can be used to perform the operation selection process 134 is described in a co-pending U.S. application entitled "Operation Prioritization and Selection in a Probability-Based Job Scheduler," in the name of Ofer et al., filed Nov. 12, 1999, and assigned Ser. No. 09/438,913, incorporated herein by reference. Other operation selection techniques that are known in the art can also be used. In the above-mentioned U.S. application, probabilities are assigned to different operation types within different priority-based classes of operations and form the basis for the operation selection. These probability values may be fixed or they may be dynamically adjusted based on system load and I/O profile.

The logical volume selection 132 (FIG. 4) will now be described in further detail. Selection of a device for job scheduling therefore includes two stages: (i) a sub-scheduler selection by the meta scheduler 62; and (ii) a device selection by the sub-scheduler selected by the meta scheduler 62.

The meta scheduler 62 decides which sub-scheduler to run based on various criteria, such as priority and urgency. Read scheduling is treated as a high priority. When system I/O load is heavy, and many devices are near their maximum write pending ceiling or have other urgent tasks, the relative importance of urgency increases.

To balance between reads and other I/O tasks, among different scheduling approaches of the different sub-schedulers, it is necessary to quantify the high priority pending tasks for all devices, for each DA 44. These metrics allow the DA 44 to measure the urgency of a device and subsequently the urgency of the tasks to be executed across the DA 44, that is, the urgency of the DA itself.

Device urgency depends on a device's pending tasks. The higher the priority of the pending tasks, the higher the urgency that the device be selected by the scheduler 60.

Figure 5:
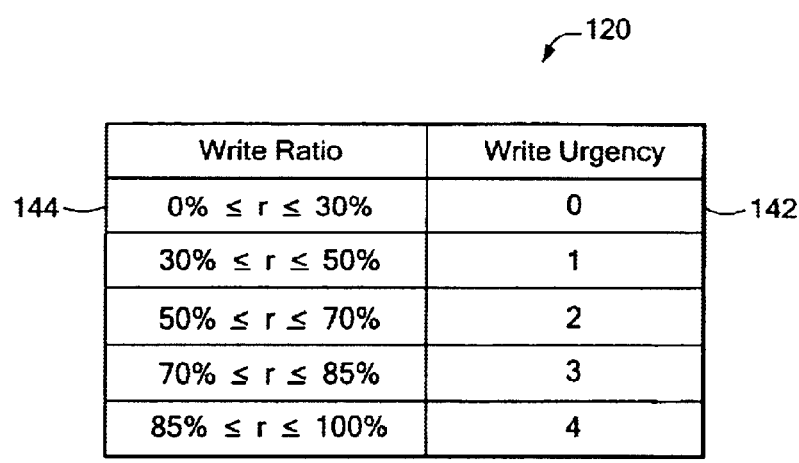
FIG. 5 is a write urgency lookup table used by the meta scheduler.

High priority task types (besides reads) include those tasks that are host response time sensitive: high priority writes, locates and high priority RAID tasks, to give a few examples. An urgency value is assigned for each of these high priority task types (if it exists), according to the following criteria: write urgency; locate urgency; and RAID urgency. The write urgency is determined according to a write ratio. FIG. 5 shows the write urgency table 120 which provides a write urgency value 142 for a given write ratio "r" 144, defined as:

$$r = dv\_wp\_count / dynamic\_max\_allowed \qquad (EQ\ 1)$$

with the ratio normalized to a value between 0 and 4, inclusive. The denominator in EQ 1 is computed as follows. Given the static device write pending ceiling 75, the dynamic device write pending ceiling 76 (three times the static device maximum), and the DA Veto mode 78, and assuming the current device write pending maximum is a value 'dynamic_max', if the DA Veto is set, then dynamic_max_allowed is equal to dynamic_max; otherwise dynamic_max_allowed is equal to dynamic device write pending ceiling 76.

If there is a pending locate task for the device (indicated by a bit set in the device's dv_record 112), the locate task urgency is set to the 'max_dv_urgency' value 82, which is '4' in the illustrated embodiment. All locate tasks are assumed to have the same urgency.

If there is a pending high priority RAID task for the device (indicated by a bit set for the device in the high priority RAID request map), the RAID task urgency is set to the 'max_dv_urgency' value 82. The RAID task urgency can also take into account loading on the RAID (group) queues used to manage pending RAID tasks. Thus, the RAID task urgency can be set to a higher urgency such as the 'max_dv urgency' value 82 when it is determined that one of the RAID queues has become full or achieved a threshold level of fullness. Like the locate tasks, all RAID tasks are assumed to have the same urgency.

The urgency of the entire device is computed according to the following formula:

$$dv\_urgency\_level = \max(\text{write urgency, locate urgency, RAID urgency}) \qquad (EQ\ 2)$$

Therefore, the device urgency 'dv_urgency_level' is a value between 0 and 4 (that is, the 'max_dv_urgency' value 82), inclusive. One byte is reserved in each device's record, 'dv_record' 112, to hold this value.

The urgency of the DA 44 defines the distribution of sub-schedulers the meta scheduler 62 should invoke, and is calculated based on the urgency levels of the devices supported by the DA 44. To arrive at this value, a total DA urgency (DA_total_urgency), the sum of all device urgency values, that is, the 'dv_urgency_level' values across all devices for the DA, is computed. This value is between 0 and (max_dv_urgency*number of devices), inclusive.

The average measure of DA urgency is defined as:

$$DA\_avg\_urgency\_level = ((256 * DA\_total\_urgency\ level)/(number\_of\_devices * max\_dv\_urgency)) * 1/32 \qquad (EQ\ 3)$$

which yields a value between 0 and 7, inclusive, where 7 is the maximum DA urgency level ('max_DA_urgency' 80).

Under an "override condition", specifically, when the system has reached its maximum WP (system WP ceiling), the max_DA_urgency value replaces the DA_avg urgency level at one point during the sub-scheduler selection process, as will be described in further detail below. This override mechanism allows write destaging operations to be performed at the expense of reads.

The operation of the meta scheduler 62 will be described with reference to the flow diagram of FIG. 6, and FIGS. 7–10, which illustrate examples of the various tables used by the meta scheduler 62.

Figure 6:
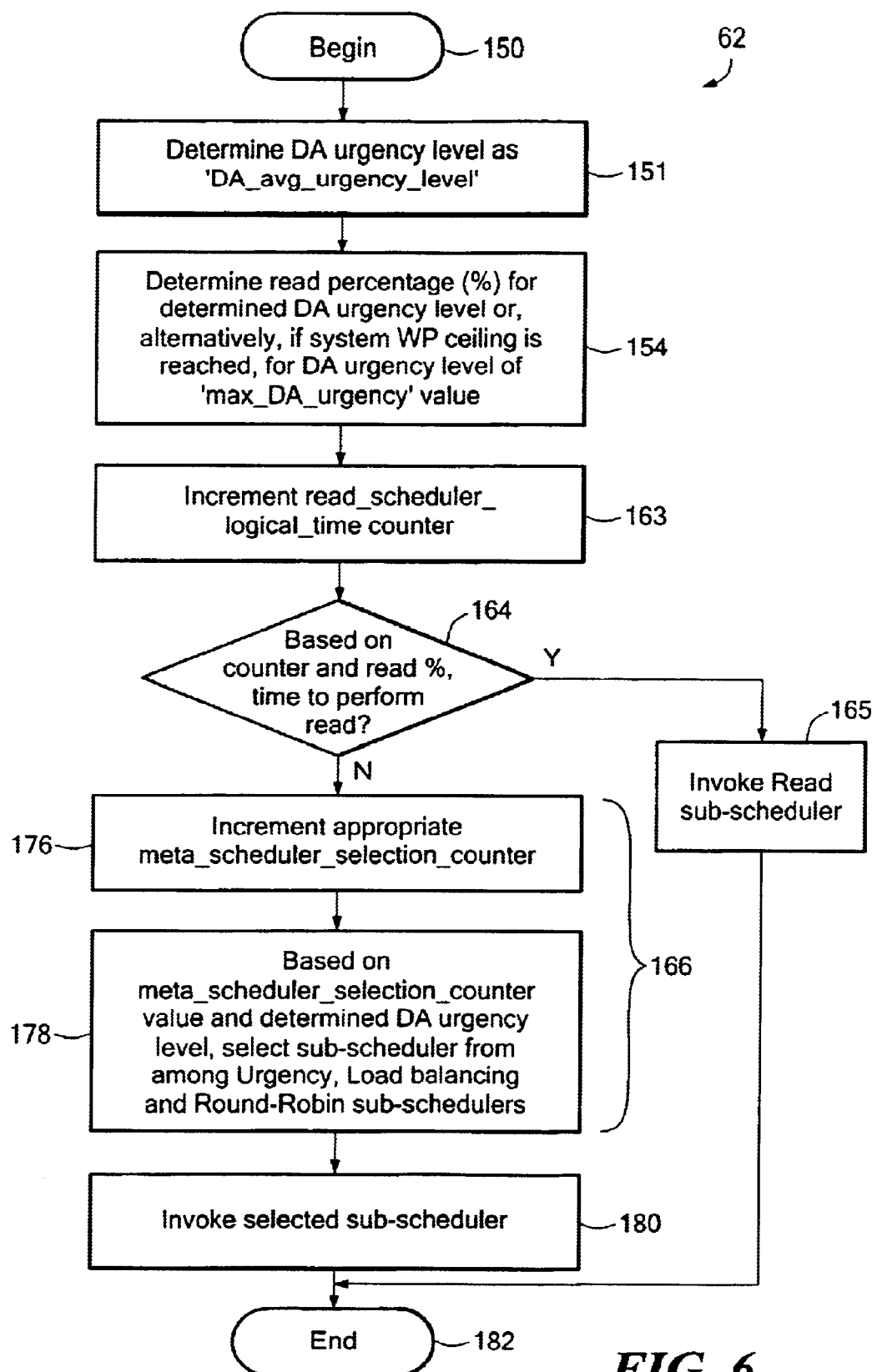
FIG. 6 is a flow diagram of the meta scheduler.

Referring to FIG. 6, the meta scheduler 62 operates as follows. The meta scheduler 62 begins (step 150) when invoked by the job scheduler 60. The meta scheduler 62 determines the DA urgency value by computing the 'DA_avg_urgency_level' value (of EQ 3 above) (step 151). The DA urgency level specified by the 'DA_avg_urgency-level' value governs sub-scheduler selection as well as sub-scheduler device selection, except under the override condition discussed above. Based on the DA urgency level, or alternatively, a value of the level corresponding to the 'max_DA_urgency' if the system WP ceiling has been reached (override condition), the meta scheduler 62 determines what percentage of time should be spent on reads (or other response time sensitive host requests, as discussed earlier)(step 154). Since reads are high priority, around 50–90% of the time is allocated for read scheduling, with the percentage dependent on how busy the DA is and how many devices have pending high priority tasks besides reads.

Figure 7:
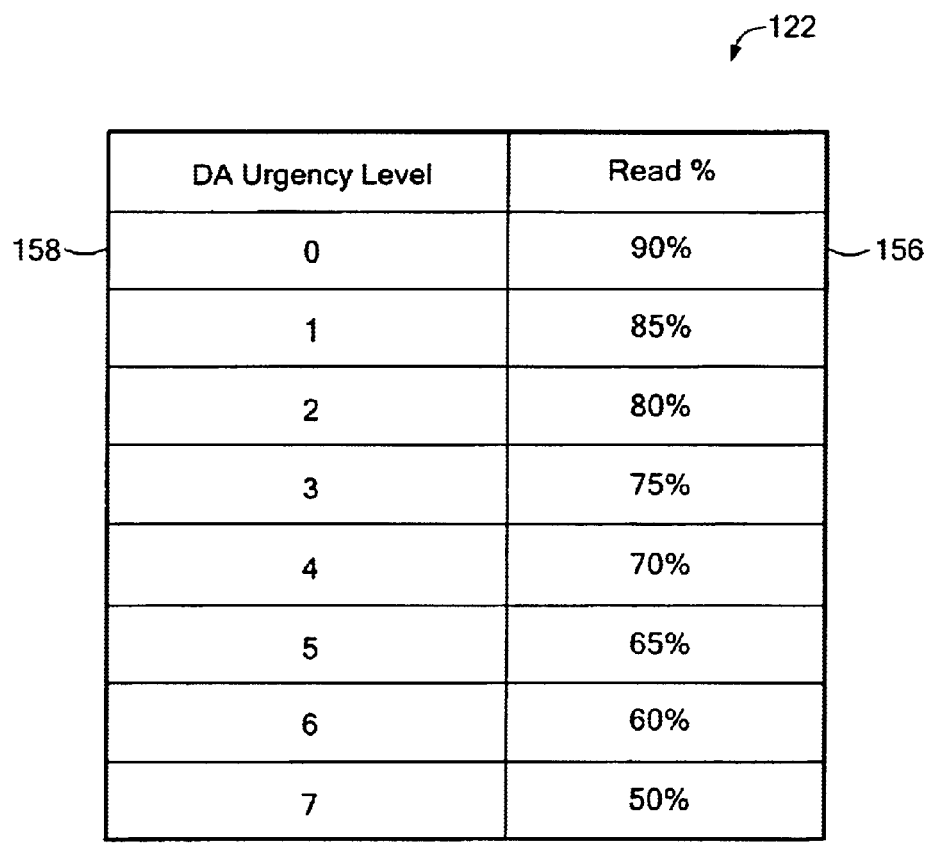
FIG. 7 is a read percentage table used by the meta scheduler.

Referring to FIG. 7, the read percentage lookup table 122 provides a read percentage 156 for each DA urgency level 158. In the example shown, the DA urgency levels range from 0 to 7, with the maximum value of '7' determined by the value stored in 'max_DA_urgency' 80. Thus, referring back to step 154 of FIG. 6, the meta scheduler 62 uses the table 122 to find the percentage (of time to spend on reads) corresponding to the DA urgency level determined at step 151 or as set for the override condition, if such condition has occurred.

Referring to FIG. 8, the probability-based read scheduler selection table 124 governs read sub-scheduler selection, with each row 160 corresponding to a read percentage and each column 162 corresponding to a count value. The table elements, corresponding to either the read sub-scheduler (indicated by 'R') or sub-schedulers other than the read sub-scheduler (indicated collectively by 'O'), are populated according to the percentages given in the table 122 of FIG. 7.

When the meta scheduler 62 is ready to perform a sub-scheduler lookup in the table 124, and referring back to FIG. 6, the meta scheduler 62 increments the count value of the 'read_scheduler_logical_time' counter 98 (step 163). The meta scheduler then uses the read percentage value (selected from table 122 using the computed DA urgency level) and the current count value of the 'read_scheduler_logical_time' counter 98 as indices into the table 124. Thus, the meta scheduler 62 determines if it is time to perform a read (step 164), that is, selects the read or other sub-scheduler, by accessing the table element located at the row corresponding to the read percentage value from the table 122 and the column corresponding to the current value of 'read scheduler_logical_time'.

Referring back to FIG. 6, if the table lookup yields an 'R', the meta scheduler 62 invokes the read sub-scheduler (step 165). Otherwise, the meta scheduler 62 determines which of the other three sub-schedulers to invoke (step 166).

Deciding between the urgency, load balancing, or round robin sub-scheduler is also probability driven through table-based lookup. Referring to FIG. 9, which shows the non-read percentage table 126, time slices are statically assigned for each sub-scheduler, that is, time slices 168a, 168b, 168c, for the urgency, load balancing and round robin sub-schedulers, respectfully, based on the DA urgency levels 170.

FIG. 10 shows the non-read task scheduler lookup table 128, which is populated with elements representing the non-read sub-schedulers based on the time slice assignments provided in table 126, governs non-read sub-scheduler selection. Each row 172 corresponds to a DA urgency level and each column 174 corresponds to a count value. The table elements include 'U', 'L' and 'R', with 'U' indicating the urgency sub-scheduler, 'L' the load balancing sub-scheduler and 'R' the round robin sub-scheduler.

Referring again to FIG. 6, the meta scheduler 62 increments the value of the counter 'meta_scheduler_selection_counter' 100(step 176). It then selects the sub-scheduler (step 178) by accessing the row 172 (from the table 128) corresponding to the DA urgency level (from step 151) and the column according to the current value of the 'meta_scheduler_selection_counter' 100.

The meta scheduler 62 invokes the selected sub-scheduler 180 and ends the meta scheduler process (step 182). If the selected sub-scheduler fails to select a device, the meta scheduler 62 may attempt to reschedule a sub-scheduler by returning to step 163. Such retry attempts would be limited in number to avoid an infinite loop condition.

The DA 44 maintains various control structures in association with different sub-schedulers. A control structure 'read_scan_device' is maintained by DA 44 to indicate the device selected the last time the read sub-scheduler 64 was invoked. A control structure 'device_last_round_robin_dv' is maintained by DA 44 to indicate the mirror selected the last time the round robin sub-scheduler 64 was invoked.

Figure 11:
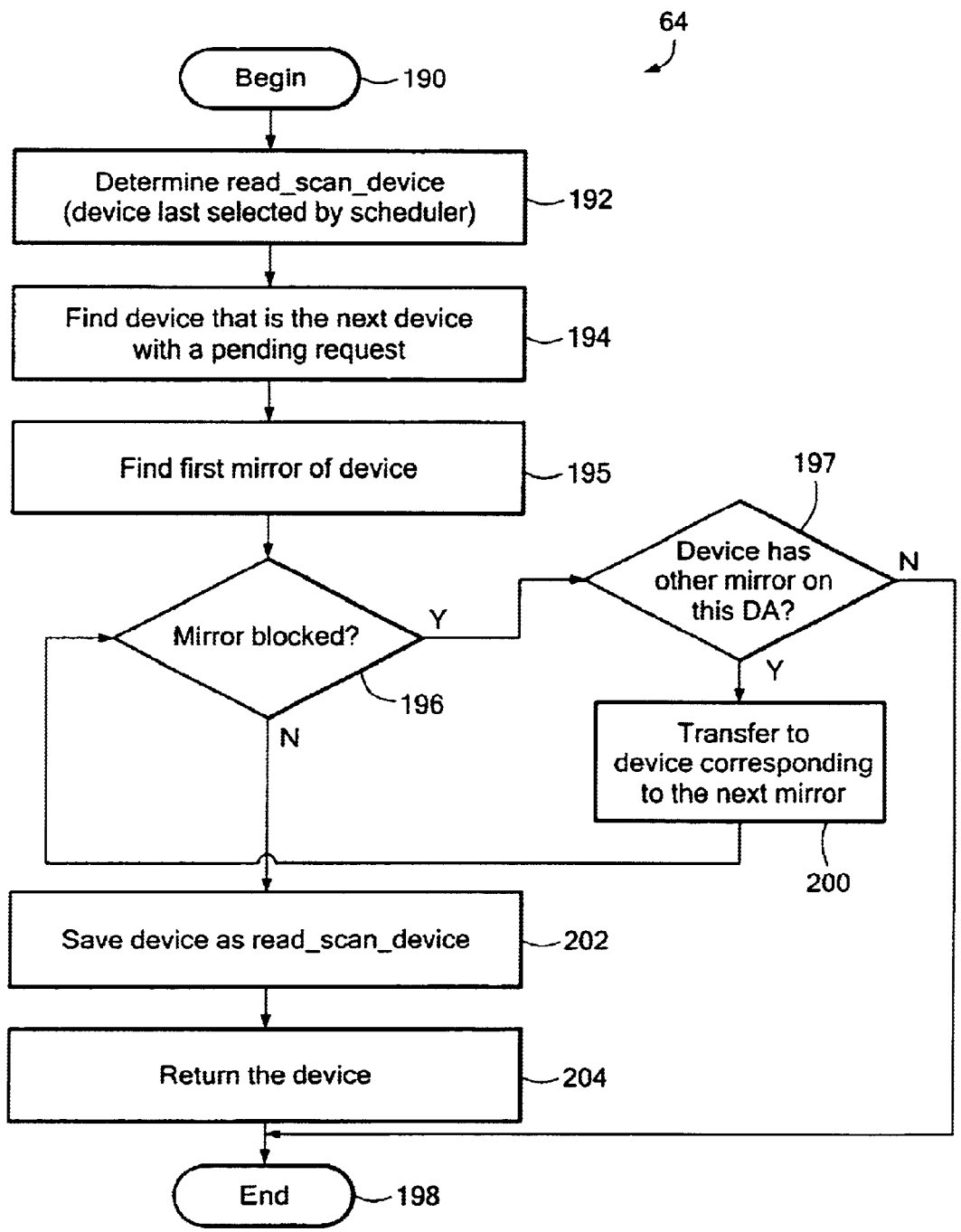
FIG. 11 is a flow diagram of the read sub-scheduler.

Referring to FIG. 11, the read sub-scheduler 64 uses a round robin algorithm that loops according to the Symmetrix number over all devices with pending read requests. The read sub-scheduler 64 begins (step 190) once invoked by the meta scheduler 62. The read sub-scheduler 64 determines the device identified by 'read_scan_device' (step 192). The read sub-scheduler 64 finds the next device with a pending read request (by accessing the da_read_request_map listed in TABLE 1 for set bits)(step 194). It then finds the first mirror of that device (step 195). If the mirror is blocked (step 196), the scheduler 64 determines if the device has another mirror supported by the DA (step 197). If no mirror is available on the DA, the sub-scheduler 64 terminates (step 198). A device may be blocked, for example, if the physical drive is processing a lengthy CDB, the device has a task and no additional jobs are allowed, or the device is has been reset. If another mirror is available on the DA, the sub-scheduler 64 transfers its selection to that device (step 200) and returns to step 196 to determine if the mirror is blocked. If it is determined, at step 196, that the mirror is not blocked, the number of the device is saved in the variable 'read_scan_device' (step 202), and returned as the selected device for use by the operation selection (step 204). Once completed, the process of the sub-scheduler 64 terminates (step 198).

The urgency sub-scheduler 66 uses the device urgency queues 94 (from FIG. 3) in selecting a device.

The devices on a given DA 44 are placed on the device urgency queues 94 according to their device urgency values. There is one device urgency queue for each of the device urgency levels. In the described embodiment, given a maximum device urgency value 'max_dv_urgency' of 4, there are five device urgency queues, with the devices having jobs of a given urgency level 'dv_urgency_level' being placed on the queue corresponding to that urgency level. In one embodiment, the device urgency queues 94 are doubly-linked lists maintained through pointers stored in each device's device record. If a device's device urgency level s changes, requiring a change in its queue placement, it is removed from its old queue and added to the end of the new queue, that is, the queue corresponding to the devices new urgency level. The device urgency queues 94 are periodically scrubbed, resorted, and reconstructed, as necessary.

Figure 12:
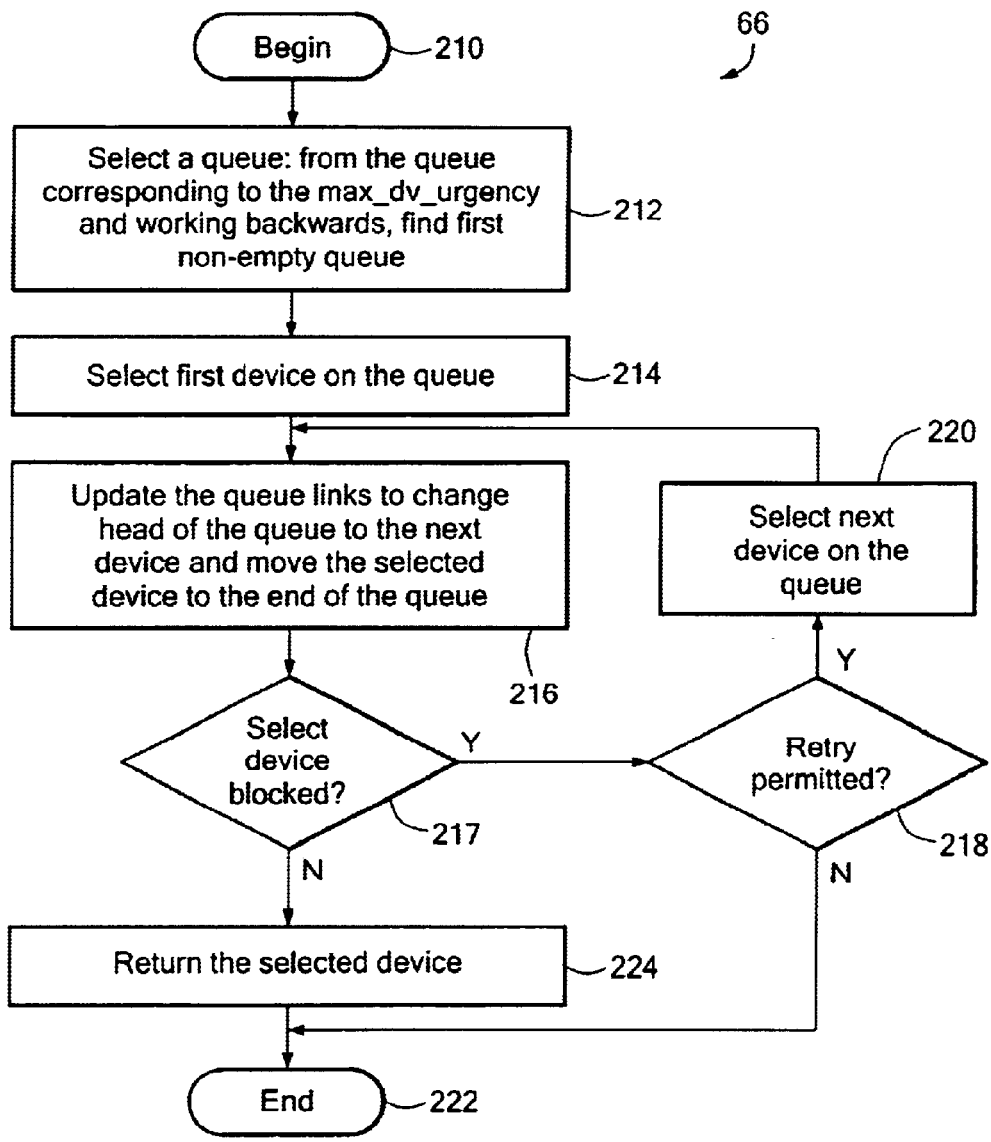
FIG. 12 is a flow diagram of the urgency sub-scheduler.

Referring to FIG. 12, the urgency sub-scheduler 66 operates as follows. It begins when invoked by the meta scheduler 62 (step 210), and proceeds to select a queue from among the device urgency queues 94 (step 212). To select a queue, the sub-scheduler 66 begins with the queue corresponding to the highest urgency level specified by the "max_dv_urgency" parameter and works backwards, that is, from the queue corresponding to the highest device urgency level to the queue corresponding to the lowest level of device urgency, to find the first non-empty device urgency queue. The urgency sub-scheduler 66 selects the first device on the selected queue (step 214). It updates the queue pointers to change the head of the queue to the next device on the queue and moves the selected device to the end of the queue (step 216). The sub-scheduler 66 determines if the device that is selected is blocked (step 217). If it is, the sub-scheduler 66 determines if a retry is permitted (step 218). The number of retry attempts is limited to allow the CPU to deal with other aspects of the system besides scheduling and prevent an infinite loop condition. If a retry is permitted, the sub-scheduler 66 returns to select the next device on the queue (step 220). If the number of permitted retries is exceeded, the sub-scheduler 66 exits (step 222) If, at step 217, it is determined that the selected device is not blocked, the sub-scheduler 66 returns the selected device (step 224) for use by the operation selection and exits (step 222).

The load balancing sub-scheduler 68 selects a device based on device records and load balancing between physical resources, including the pipe and physical drives. An example of a mechanism which can be used to perform the load balancing based device selection of the load balancing sub-scheduler 68 is described in a co-pending U.S. application entitled "A Logical Volume Selection in a Probability-Based Job Scheduler," filed Nov. 12, 1999, Ser. No. 09/439, 903, in the name of Mason et al., incorporated herein by reference. Other operation selection techniques that are known in the art can also be used.

Referring the FIG. 13, the operation of the round robin sub-scheduler 70 is as follows. The round robin sub-scheduler 70 selects a device based solely on device records. It begins (step 230) when invoked by the meta scheduler 62. Starting at the device identified by the number stored in the variable 'device_last_round_robin_dv', that is, the device last selected by the round robin sub-scheduler 70, and proceeding in round robin fashion, the sub-scheduler 70 finds the next device with pending tasks (by accessing the da_new_task_map for set bits) and selects that device (step 232). The sub-scheduler 70 determines if the selected device is blocked (step 233). If the selected device is blocked, the sub-scheduler 70 determines if a retry is permitted (step 234). If a retry is permitted (e.g., a retry limit has not been reached), the sub-scheduler 70 searches for the next device with pending tasks (step 236). If a retry is not permitted, the sub-scheduler 70 exits (step 238). If the selected device is determined not to be blocked (at step 233), the sub-scheduler 70 saves the number of the selection in the variable 'last_round_robin_dv' (step 240). The sub-scheduler 70 returns the selected device (step 242) for use by the operation selection and exits (step 238).

After a sub-scheduler selects a device, it selects the operation type. The read sub-scheduler of course always schedules a read job. Operations scheduling occurs according to the table-based techniques described in the above-reference U.S. patent application Ser. No. 09/438,913, with the following modification for urgency scheduling: if a device is selected because it has some urgent pending tasks, only those high priority task types need be considered; other job types are excluded when building the class mask.

Scheduler utilities allow the job scheduling tables 92 to be displayed and modified, and for scheduler/job related statistics (e.g., job generation attempt counts) to be displayed. The tables 92 and parameters in the parameter store 59 may be modified (via the service management console PC) off-line or while the system is in use.

Additions, subtractions, and other modifications of the preferred embodiments of the invention will be apparent to those practiced in this field and are within the scope of the following claims.

What is claimed is:

1. A method for scheduling I/O tasks directed to logical volumes that are associated with physical resources of a data storage system, comprising:

selecting one of the logical volumes to have a next I/O task be an I/O task directed to the selected one of the logical volumes, wherein the selected one of the logical volumes is selected based on criteria related to type of I/O task; and choosing as the next I/O task an I/O task directed to the selected one of the logical volumes.

2. The method of claim 1, wherein the criteria includes I/O task urgency and priority.

3. The method of claim 2, wherein the selecting includes performing a load balancing of the physical resources.

4. The method of claim 1, wherein selecting comprises:
using a main scheduler to select a sub-scheduler from multiple sub-schedulers based on the criteria; and using the selected sub-scheduler to select the logical volume.

5. The method of claim 4, wherein one of the sub-schedulers operates to select a logical volume for I/O tasks that are read I/O requests.

6. The method of claim 5, wherein others of the sub-schedulers include an urgency sub-scheduler that operates to select a logical volume for non-read I/O tasks based on urgency of the non-read I/O tasks.

7. The method of claim 5, wherein the others of the sub-schedulers further include a sub-scheduler that operates to select a logical volume using a round robin algorithm.

8. The method of claim 5, wherein the others of the sub-schedulers further include a sub-scheduler that operates to select a logical volume based on a load balancing of the physical resources.

9. The method of claim 6, wherein the logical volumes are controlled by a disk adapter and wherein using the main scheduler comprises:

defining a range of urgency levels;

determining an urgency level in the range of urgency levels for each of the logical volumes based on urgency levels associated with non-read I/O tasks pending on such logical volume;

defining a range of disk adapter urgency levels from a lowest to a maximum value;

associating with the disk adapter urgency levels in the range of disk adapter urgency levels time percentages each corresponding to an amount of time allocated to performing read I/O requests, the time percentage associated with the maximum value being the lowest of the time percentages;

determining if a maximum number of write pendings has been reached for the data storage system;

determining a disk adapter urgency level as a value in the range of disk adapter urgency levels for the disk adapter based on the urgency levels of the logical volumes if the maximum number of write pendings has not been reached for the data storage system;

setting the disk adapter urgency level to the maximum value in the range of disk adapter urgency levels if the maximum number of write pendings has been reached for the data storage system;

determining which of the time percentages is associated with the determined disk adapter urgency level; and using the determined time percentage to select between the read sub-scheduler and the others of the sub-schedulers.

10. The method of claim 9, wherein using the main scheduler further comprises:

using a probability-based lookup to determine which of the other sub-schedulers to use if the read scheduler is not selected.

11. The method of claim 10, wherein the probability-based lookup uses a table populated with elements corresponding to the others of the sub-schedulers according to pre-determined time percentages corresponding to amounts of time allocated to the other sub-schedulers, the table having rows corresponding to the disk adapter urgency levels and the disk adapter urgency level being used to index into the table.

12. The method of claim 6, wherein the logical volumes are placed on one of a plurality of queues according to the determined urgency level of each logical volume, each of the queues corresponding to a different one of the urgency levels in the range of urgency levels;

proceeding to check the queues in order from higher urgency level to lowest urgency level to find a non-empty queue; and selecting a first available logical volume from the queue.

13. An apparatus for scheduling I/O tasks directed to logical volumes that are associated with physical resources of a data storage system, comprising a stored computer program in memory instituting the steps of selecting one of the logical volumes to have a next I/O task be an I/O task directed to the selected one of the logical volumes, the selection being based on criteria related to type of I/O task; and choosing as the next I/O task an I/O task directed to the selected one of the logical volumes.

14. The apparatus of claim 13, wherein the criteria includes I/O task urgency and priority.

15. The apparatus of claim 14, wherein the program instituted step of selecting comprises:

using a main scheduler to select a sub-scheduler from multiple sub-schedulers based on the criteria; and using the selected sub-scheduler to select the logical volume.

16. The apparatus of claim 15, wherein one of the sub-schedulers operates to select a logical volume for I/O tasks that are read I/O requests.

17. The apparatus of claim 15, wherein others of the sub-schedulers include an urgency sub-scheduler that operates to select a logical volume for non-read I/O tasks based on urgency of the non-read I/O tasks.

18. The apparatus of claim 15, wherein the others of the sub-schedulers further include a sub-scheduler that operates to select a logical volume using a round robin algorithm.

19. The apparatus of claim 15, wherein the others of the sub-schedulers further include a sub-scheduler that operates to select a logical volume based on a load balancing of the physical resources.

20. The apparatus of claim 16, wherein the logical volumes are controlled by a disk adapter and wherein the program instituted step of using the main scheduling comprises:

defining a range of urgency levels;

determining an urgency level in the range of urgency levels for each of the logical volumes based on urgency levels associated with non-read I/O tasks pending on such logical volume;

defining a range of disk adapter urgency levels from a lowest to a maximum value;

associating with the disk adapter urgency levels in the range of disk adapters time percentages each corresponding to an amount of time allocated to performing read I/O requests, the time percentage associated with the maximum value being the lowest of the time percentages;

determining if a maximum number of write pendings has been reached for the data storage system;

determining a disk adapter urgency level as a value in the range for the disk adapter based on the urgency levels of the logical volumes if it is determined that the maximum number of write pendings has not been reached for the data storage system;

setting the disk adapter urgency level to the maximum value in the range of disk adapter urgency levels if it is determined that the maximum number of write pendings has been reach for the data storage system;

determining which of the time percentages is associated with the determined disk adapter urgency level; and using the determined time percentage to select between the read sub-scheduler and the others of the sub-schedulers.

21. The apparatus of claim 20, wherein the program instituted step of using the main scheduler further comprises:

using a probability-based lookup to determine which of the other sub-schedulers to use if the read scheduler is not selected.

22. A data storage system comprising:

a plurality of physical resources;

a controller for managing the plurality of physical resources, the controller configured to execute a job scheduler that schedules I/O tasks directed to logical volumes supported on the plurality of physical resources; and wherein the job scheduler is configured to select one of the logical volumes to have a next I/O task be an I/O task directed to the selected one of the logical volumes, the selection being based on criteria related to type of I/O task and to select as a next I/O task an I/O task directed to the selected one of the logical volumes.

23. The data storage system of claim 22, wherein the job scheduler includes a main scheduler and multiple sub-schedulers, the main scheduler being used to select one of the multiple sub-schedulers based on the criteria, and each of the sub-schedulers being used to select a logical volume when selected by the main scheduler.

* * * * *

UNITED STATES PATENT AND TRADEMARK OFFICE
CERTIFICATE OF CORRECTION

PATENT NO. : 6,904,470 B1
DATED : June 7, 2005
INVENTOR(S) : Ofer et al.

It is certified that error appears in the above-identified patent and that said Letters Patent is hereby corrected as shown below:

Column 1,
Line 24, delete "related to type" and replace with -- related to the type --.
Line 42, delete "sub-schedules" and replace with -- sub-schedulers --.

Column 4,
Line 53, delete "(or the volatile memory 53))," and replace with
-- (or the volatile memory 53), --.

Column 5,
Line 43, delete "devicewrite" and replace with -- device write --.

Column 6,
Line 6, delete "a_flag" and replace with -- a flag --.
Line 14, delete "to produces a flag" and replace with -- to produce a flag --.

Column 9,
Line 21, delete "'read scheduler_logical_time'" and replace with
-- 'read_scheduler_logical_time' --.

Column 10,
Line 11, delete "device is has been" and replace with -- device has been --.
Lines 33-34, delete "level s changes," and replace with -- level changes, --.
Line 61, delete "(step 222) If," and replace with -- (step 222). If, --.

Figure 13:
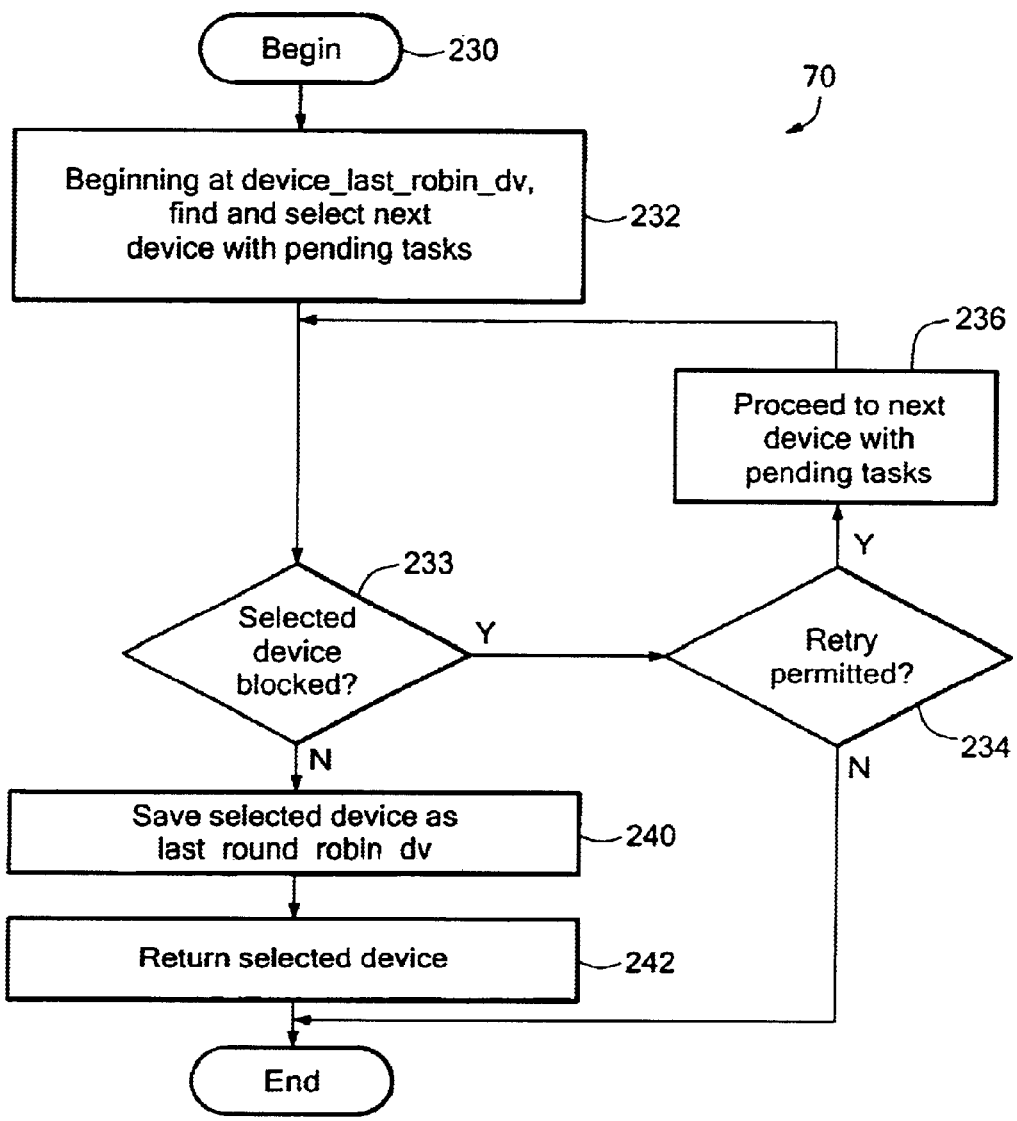
FIG. 13 is a flow diagram of a round robin sub-scheduler.

Column 11,
Line 10, delete "Referring the FIG. 13," and replace with -- Referring to FIG. 13, --.
Lines 35-36, delete "above-refence" and replace with -- above-referenced --.

Column 13,
Line 7, delete "comprising" and replace with -- comprising: --.
Line 9, delete "steps of" and replace with -- steps of: --.
Line 13, delete "to type of" and replace with -- to the type of --.

UNITED STATES PATENT AND TRADEMARK OFFICE
CERTIFICATE OF CORRECTION

PATENT NO. : 6,904,470 B1
DATED : June 7, 2005
INVENTOR(S) : Ofer et al.

It is certified that error appears in the above-identified patent and that said Letters Patent is hereby corrected as shown below:

Column 14,
Line 39, delete "to type of" and replace with -- to the type of --.

Signed and Sealed this

Twenty-eighth Day of March, 2006

JON W. DUDAS
*Director of the United States Patent and Trademark Office*